(12) United States Patent
Kikuchi

(10) Patent No.: US 8,130,138 B2
(45) Date of Patent: Mar. 6, 2012

(54) OBJECT DETECTING APPARATUS

(75) Inventor: Hayato Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 12/694,640

(22) Filed: Jan. 27, 2010

(65) Prior Publication Data

US 2010/0214153 A1   Aug. 26, 2010

(30) Foreign Application Priority Data

Feb. 24, 2009   (JP) ................................ 2009-040477

(51) Int. Cl.
*G01S 13/93* (2006.01)

(52) U.S. Cl. .............. 342/70; 342/71; 342/72; 342/195; 342/118

(58) Field of Classification Search .............. 342/70–72, 342/27, 118, 133, 139, 146, 159–162, 195; 701/301

See application file for complete search history.

(56) References Cited

U.S. PATENT DOCUMENTS

| | | | |
|---|---|---|---|
| 6,452,665 B1 * | 9/2002 | Kikuchi | 356/4.01 |
| 6,657,582 B2 * | 12/2003 | Seki et al. | 342/70 |
| 6,693,583 B2 * | 2/2004 | Tamatsu et al. | 342/70 |
| 6,898,528 B2 * | 5/2005 | Zorka et al. | 701/301 |
| 2003/0122703 A1 * | 7/2003 | Kishida et al. | 342/70 |
| 2010/0214153 A1 * | 8/2010 | Kikuchi | 342/70 |

FOREIGN PATENT DOCUMENTS

| | | | | |
|---|---|---|---|---|
| JP | 04145389 | A | * | 5/1992 |
| JP | 04355390 | A | * | 12/1992 |
| JP | 2000-039474 | A | | 2/2000 |
| JP | 2000-147115 | A | | 5/2000 |
| JP | 2001-051059 | A | | 2/2001 |
| JP | 2003-270342 | A | | 9/2003 |
| JP | 3676625 | B2 | | 5/2005 |
| JP | 2010197133 | A | * | 9/2010 |

* cited by examiner

*Primary Examiner* — John Sotomayor
(74) *Attorney, Agent, or Firm* — Arent Fox LLP

(57) ABSTRACT

A ghost target candidate judging device judges that one target of two targets is a candidate for a ghost target where the distances of the two targets from a subject vehicle are equal to each other and where the difference between receiving levels of the two targets is not less than a predetermined value. A running-abreast target judging device judges that one target is the target running abreast of the other target based on changes in an angle difference and in a left-right positional difference between the two targets in accordance with the change in the distances of the two targets from the subject vehicle. The ghost target judging device judges, as the ghost target, a target obtained by removing the running-abreast target data from the candidates for the ghost target. The running-abreast target is prevented from being erroneously recognized as the ghost target while judging which target is the ghost target. Also, a target indicating a lower receiving level is prevented from erroneously being judged as a ghost target when two targets indicating their respective different receiving levels are running side by side.

6 Claims, 14 Drawing Sheets

INCREASE SIDE

DECREASE SIDE (1) WHEN MAIN BEAM IS DIRECTED TO LEFT AT 4 DEGREES (2) WHEN MAIN BEAM IS DIRECTED FRONTWARD

DATA FOR ONE CYCLE RESULTING FROM COMBINATION OF CASES (1) AND (2)

AFTER ADOPTING CONVENTIONAL GHOST REMOVING LOGIC (1) WHEN MAIN BEAM IS DIRECTED TO LEFT AT 4 DEGREES (2) WHEN MAIN BEAM IS DIRECTED FRONTWARD

DATA FOR ONE CYCLE RESULTING FROM COMBINATION OF CASES (1) AND (2)

IN CASE OF GHOST GENERATED DUE
TO DETECTION OF SIDE LOBE BEAM

Time-1:

Time-2:

Time-3:

Time-4:

OBJECT DETECTING APPARATUS

CROSS-REFERENCE TO RELATED APPLICATION

This application claims the priority of Japanese Application No. 2009-40477, filed Feb. 24, 2009, the entire specification, claims and drawings of which are incorporated herewith by reference.

BACKGROUND OF THE INVENTION

1. Field of the Invention

The present invention relates to an object detecting apparatus configured to detect a target by transmitting an electromagnetic wave, and by receiving a reflected wave resulting from reflection of the electromagnetic wave off the target.

2. Description of the Related Art

When a radar beam transmitted from a radar system is refracted due to a prism effect of ice crystals adhering to a radome of the radar system, and a ghost beam is accordingly outputted in a direction different from a direction of a main beam, the radar system may undesirably detect a ghost target and the actual or true target by receiving the ghost beam and the reflected wave of the main beam off the true target. Thus, the radar system may erroneously detect a ghost target that does not exist.

To address this issue, a radar system which avoids the erroneous detection of a ghost target is disclosed in Japanese Patent No. 3676625. The radar system deletes ghost data based on the fact that the distance to the true target and the distance to the ghost target are equal to each other; and that the receiving level of the reflected wave of the ghost target is lower than the receiving level of the reflected wave of the true target.

Several reasons are attributed to the detection of the ghost target by the radar system.

One reason is that, as shown in FIG. 5A, the radar system outputs side lobe beams in directions which are offset to the left and right at a predetermined angle (approximately 4 degrees in general) from the direction of the main beam, respectively. Although each side lobe beam is weaker than the main beam, the radar system detects a ghost target when receiving a reflected wave of the side lobe beam.

Another reason is that, as shown in FIG. 5B, the radar system outputs a ghost beam in a direction which is offset to the left or right at a predetermined angle from the direction of the main beam because ice crystals adhering to the surface of the radome, or flaws or the like in the surface of the radome, act like a prism on the main beam. Although the ghost beam is weaker than the main beam, the radar system detects a ghost target when receiving a reflected wave of the ghost beam.

Yet another reason is that, as shown in FIG. 5C, the traveling direction of the main beam changes when being reflected by a roadside object, such as a guard rail. The radar system detects a ghost target when receiving the reflected wave of such a main beam after the reflected wave is again reflected by a target.

Referring to FIGS. 6A to 6D, detailed descriptions will be provided for the reason why a ghost target is detected when a side lobe beam is outputted.

Suppose a case where, as shown in FIG. 6A, a preceding vehicle, which serves as a detection target, runs in an adjacent left lane of a lane in which a subject vehicle runs, and where a main beam directed to the left at an angle of 4 degrees from the forward direction of the vehicle body detects the preceding vehicle. In this case, a side lobe beam directed to the left at an angle of 4 degrees from the direction of the main beam is not reflected by the preceding vehicle. For this reason, a ghost target is not detected.

When the main beam is scanned to the right to be directed ahead of the vehicle body, as shown in FIG. 6B, the main beam is not reflected by the preceding vehicle, but the side lobe beam is instead reflected by the preceding vehicle. In this case, a ghost target of the preceding vehicle is detected in the direction of the main beam (ahead of the vehicle body of the subject vehicle).

As shown in FIG. 6C, a data set for one cycle composed of the two foregoing cases includes a real data set on the adjacent left lane; and a ghost data set on the lane in which the subject vehicle runs. For this reason, the radar system erroneously recognizes that two preceding vehicles are running side by side at the same speed in the two respective lanes at the same distance from the subject vehicle. Due to such erroneous detection, an unnecessary decelerating control operation may be carried out to avoid getting closer to the ghost target on the subject vehicle's lane, which may confuse the driver.

As shown in FIG. 6D, the invention described in Japanese Patent No. 3676625 solves the foregoing problem by deleting, as ghost data, one of two data sets that indicate that their targets are detected at the same distance and have a certain difference between their receiving levels. The deleted data set has a lower receiving level than the retained data set.

However, the radar system disclosed in Japanese Patent No. 3676625 may cause a problem under a specific condition, which will be described by referring to FIGS. 7A to 7C.

Suppose a situation where, as shown in FIG. 7A, a truck and a passenger vehicle run side by side, respectively, in the left adjacent lane and the lane in which the subject vehicle runs, at the same distance from the subject vehicle and at the same speed, and where a main beam directed to the left at an angle of 4 degrees relative to the subject vehicle detects the truck.

As shown in FIG. 7B, when the main beam is scanned to the right to be directed ahead of the vehicle body of the subject vehicle, the passenger vehicle running in the subject vehicle's lane is detected.

As shown in FIG. 7C, a data set for one cycle composed of the two foregoing cases includes a data set which indicates the truck running in the adjacent left lane has a higher receiving level; and a data set which indicates the passenger vehicle running in the subject vehicle's lane has a lower receiving level. In addition, the two data sets indicate that their respective detection distances are equal to each other. For this reason, the condition is similar to that shown in FIG. 6D, and accordingly the data set of the passenger vehicle, which is real or actual data, may be erroneously deleted for being ghost data.

SUMMARY OF THE INVENTION

The present invention has been attained with the above-described situations taken into consideration. An aspect of the present invention is to prevent a target indicating a lower receiving level from being erroneously judged as a ghost target when two targets indicating their respective different receiving levels are running side by side.

According to a first feature of the present invention, there is provided an object detecting apparatus configured to detect a target by transmitting an electromagnetic wave, and by receiving a reflected wave resulting from reflection of the electromagnetic wave by the target. The apparatus includes ghost target candidate judging means configured to judge that a first target of two targets is a candidate for a ghost target of a second target of the two targets in a situation where distances of the two targets from a subject vehicle are equal to each other and where a difference between receiving levels of the two targets is equal to or greater than a predetermined value; running-abreast target judging means configured to judge that the first target is a target running abreast of the second target on a basis of changes in an angle difference and in a left-right positional difference between the two targets in accordance with a change in the distances of the two targets from the subject vehicle; and ghost target judging means configured to judge, as a ghost target, a target obtained by removing the running-abreast target judged by the running-abreast target judging means, from the candidates for the ghost target judged by the ghost target candidate judging means.

With the above-described structural configuration, in the situation where the distances of the two targets from the subject vehicle are equal to each other and where the difference between the receiving levels of the two targets is not less than the predetermined value, the ghost target candidate judging means judges that one target is a candidate for the ghost target. The running-abreast target judging means judges that one target is the target running abreast of the other target based on the changes in the angle difference and in the left-right positional difference between the two targets, the changes corresponding to the change in the distances of the two targets from the subject vehicle. The ghost target judging means judges, as the ghost target, a target obtained by removing the running-abreast target judged by the running-abreast target judging means, from candidates for the ghost target judged by the ghost target candidate judging means. Consequently, it is possible to prevent the running-abreast target from being erroneously judged or determined as the ghost target while judging which target is the ghost target with high precision.

According to a second feature of the present invention, the running-abreast target judging means judges that the first target is the target running abreast of the second target in a situation where a change in the distances of the two targets from the subject vehicle is accompanied by a change in the angle difference between the two targets and is not accompanied by a change in the left-right positional difference between the two targets.

With the above-described structural configuration, the running-abreast target judging means judges that one target is the target running abreast of the other target in the situation where the change in the distances of the two targets from the subject vehicle is accompanied by the change in the angle difference between the two targets and is not accompanied by the change in the left-right positional difference between the two targets. Consequently, it is possible to judge which target is the running-abreast target with high precision.

According to a third feature of the present invention, the running-abreast target judging means judges that the first target is not the target running abreast of the second target in a situation where a change in the distances of the two targets from the subject vehicle is not accompanied by a change in the angle difference between the two targets and is accompanied by a change in the left-right positional difference between the two targets.

With the above-described structural configuration, the running-abreast target judging means judges that one target is not the target running abreast of the other target in the situation where the change in the distances of the two targets from the subject vehicle is not accompanied by the change in the angle difference between the two targets and is accompanied by the change in the left-right positional difference between the two targets. Consequently, it is possible to judge which target is the ghost target with high precision.

The above description, other aspects, characteristics and advantages of the present invention will be clear from detailed descriptions which will be provided for the preferred embodiment together with the attached drawings.

DESCRIPTION OF THE PREFERRED EMBODIMENT

Descriptions of a preferred embodiment of the present invention will be provided below and by referring to FIGS. 1 to 14.

Figure 1:
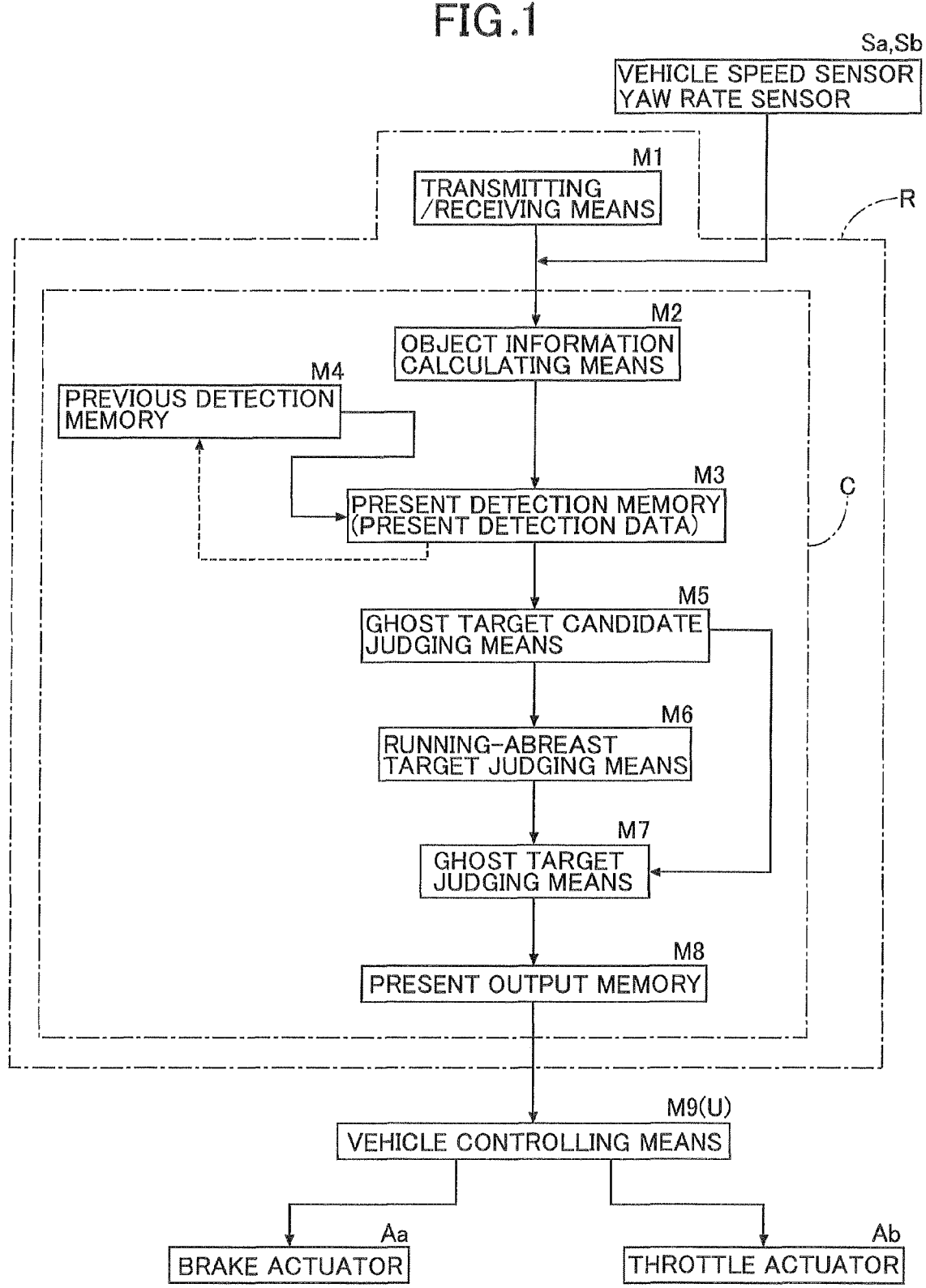
FIG. 1 is a schematic diagram of an object detecting apparatus.

As shown in FIG. 1, an FMCW (Frequency Modulated Continuous Wave) radar system R includes transmitting/receiving means M1, object information calculating means M2, a present detection memory M3, a previous detection memory M4, ghost target candidate judging means M5, running-abreast target judging means M6, ghost target judging means M7, and a present output memory M8. A vehicle speed sensor Sa and a yaw rate sensor Sb are connected to the object information calculating means M2. A vehicle controlling means M9, which is a vehicle-to-vehicle distance controller, is connected to the present output memory M8. A brake actuator Aa and a throttle actuator Ab are connected to the vehicle controlling means M9.

Figure 2:
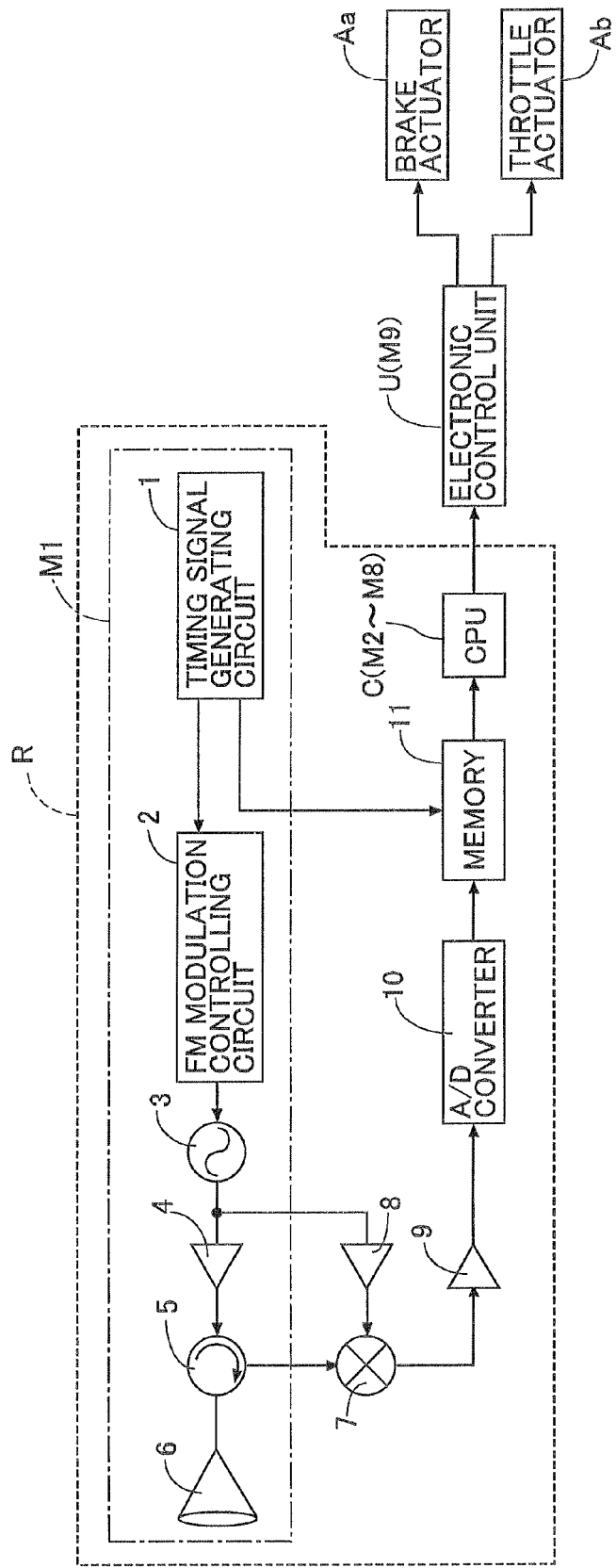
FIG. 2 is a schematic diagram of a millimeter-wave radar system.

The configuration of the FMCW radar system R will now be provided while referring to FIGS. 2 to 4.

As shown in FIG. 2, the transmitting/receiving means M1 is configured to include a timing signal generating circuit 1, an FM modulation controlling circuit 2, an oscillator 3, an amplifier 4, a circulator 5 and a transmission/reception antenna 6. Based on a timing signal inputted from the timing signal generating circuit 1, the FM modulation controlling circuit 2 modulates and controls the oscillation of the oscillator 3. Thus, as shown by a solid line in FIG. 3A, the frequency of the signal is modulated into a frequency with triangular waveforms. The thus-modulated transmission signal from the oscillator 3 is inputted into the transmission/reception antenna 6 through the amplifier 4 and the circulator 5. As such, an FMCW wave is transmitted from the transmission/reception antenna 6. When an object, such as a preceding vehicle, is ahead of the transmission/reception antenna 6, a reflected wave resulting from the reflection by the object is received by the transmission/reception antenna 6. The reflected wave appears, for instance, as shown by the broken line in FIG. 3A, when the object ahead comes closer to the transmission/reception antenna 6. On each increase side where the frequency of the transmitted wave linearly increases, the reflected wave appears with a frequency lower than that of the transmitted wave and appears later than the transmitted wave. On each decrease side where the frequency of the transmitted wave linearly decreases, the reflected wave appears with a frequency higher than that of the transmitted wave and appears later than the transmitted wave.

The radar system R further includes a mixer 7, additional amplifiers 8 and 9, an A/D converter 10, a memory 11, and a central processing unit C. The central processing unit C defines the object information calculating means M2, the present detection memory M3, the previous detection memory M4, the ghost target candidate judging means M5, the running-abreast target judging means M6, the ghost target judging means M7, and the present output memory M8.

Figure 3A:
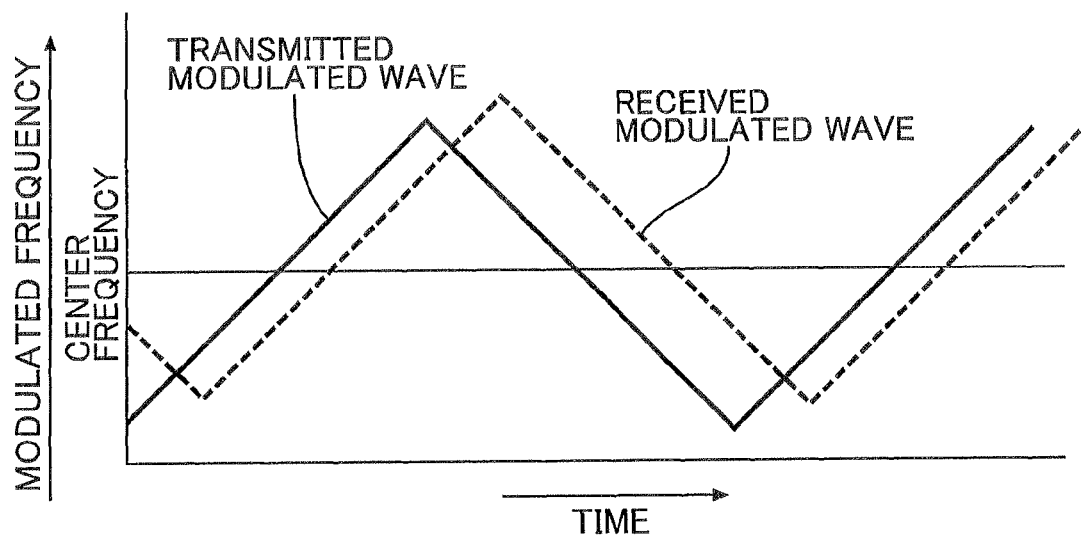
FIGS. 3A and 3B are timecharts of a waveform and a peak frequency of transmitted/received wave when an object approaches a transmitting/receiving means.
Figure 3B:
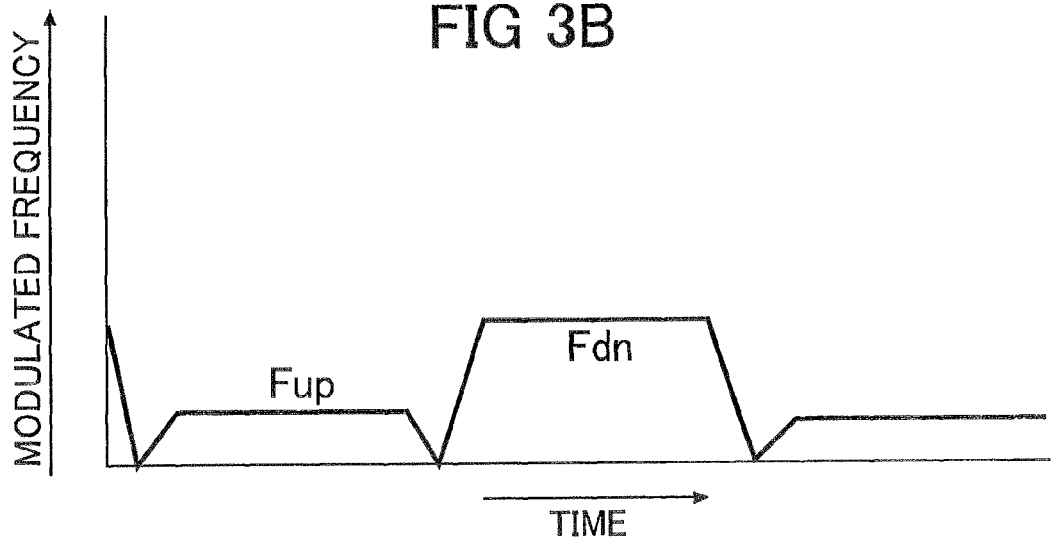

The received wave received by the transmission/reception antenna 6 is inputted into the mixer 7 through the circulator 5. In addition to the received wave from the circulator 5, a transmitted wave, which is distributed from the transmitted wave outputted from the oscillator 3, is inputted into the mixer 7 through the amplifier 8. The mixer 7 mixes the transmitted wave and the received wave. Thereby, as shown in FIG. 3B, the mixer 7 generates a beat signal which has a peak frequency Fup on each increase side where the frequency of the transmitted wave linearly increases; and a peak frequency Fdn on each decrease side where the frequency of the transmitted wave linearly decreases.

The beat signal obtained by the mixer 7 is amplified to a necessary amplitude level by the amplifier 9. The resultant beat signal is converted from analog to digital by the A/D converter 10 at each sampling time. Thus, a digitalized data set is stored and retained in chronological order in the memory 11. The timing signal is inputted into the memory 11 from the timing signal generating circuit 1. In response to the timing signal, the memory 11 stores and retains the data set on each increase side where the frequency of the transmitted signal increases, and on each decrease side where the frequency thereof decreases.

Based on the data set stored in the memory 11, the central processing unit C calculates an angle, distance and relative speed at which the object is detected based on the subject vehicle, and sends the calculation results to an electronic control unit U in a manner that is described below. Upon reception of the signal from the central processing unit C, the vehicle controlling means M9 component of the electronic control unit U controls the operations, respectively, of the brake actuator Aa and the throttle actuator Ab for the purpose of keeping a constant distance between the subject vehicle and the preceding vehicle.

It should be noted that the search by the radar system R to detect a target is performed at cycles of 100 msec, for instance.

Figure 4A:
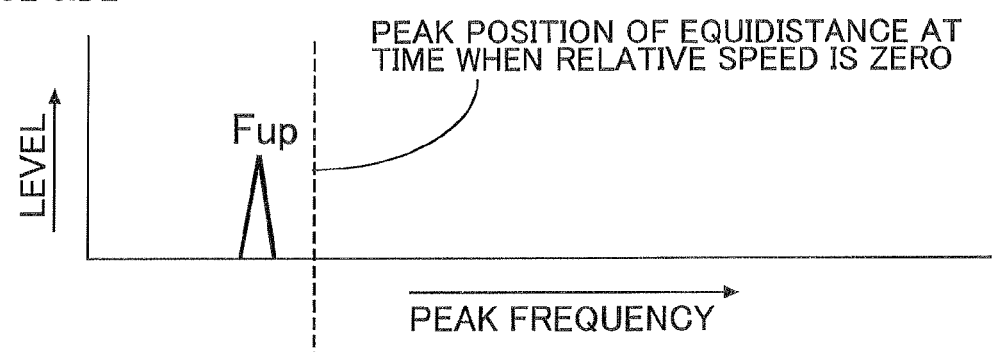
FIGS. 4A and 4B are graphs of a peak signal corresponding to FIGS. 3A and 3B.
Figure 4B:
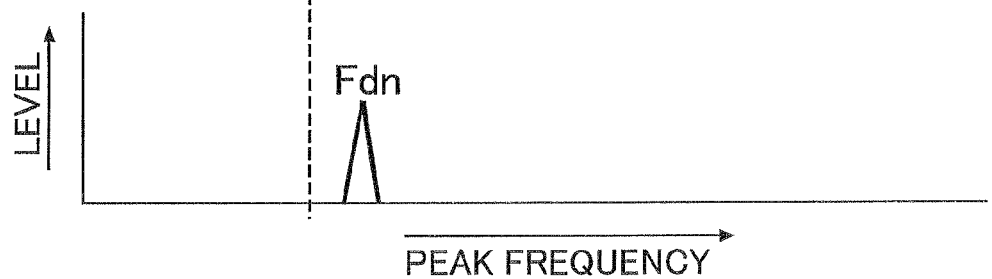
Figure 5A:
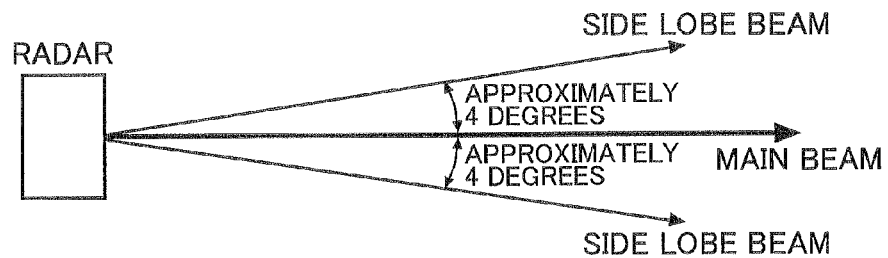
FIGS. 5A-5C are illustrations used to explain reasons why a ghost target is detected.
Figure 5B:
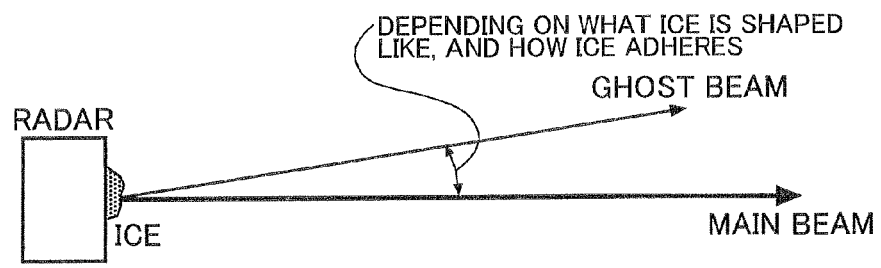
Figure 5C:
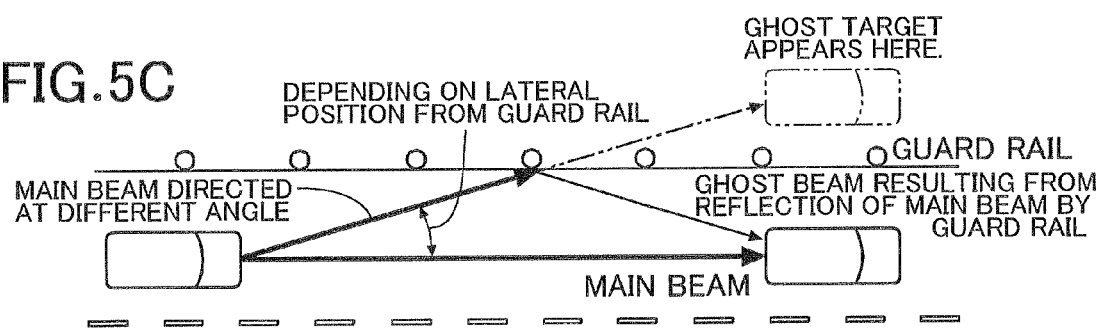
Figure 6A:
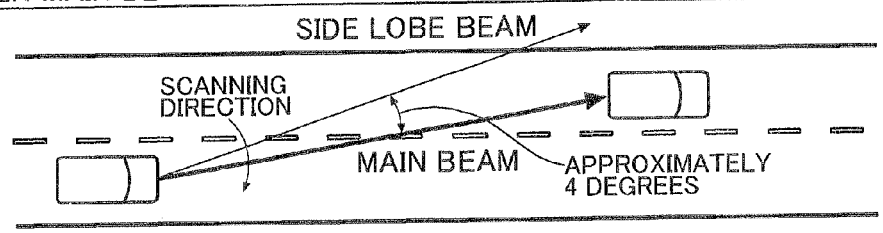
FIGS. 6A-6D are illustrations used to explain a conventional approach to delete a ghost target.
Figure 6B:
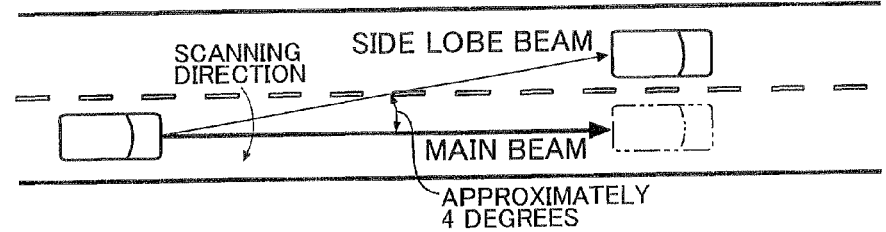
Figure 6C:
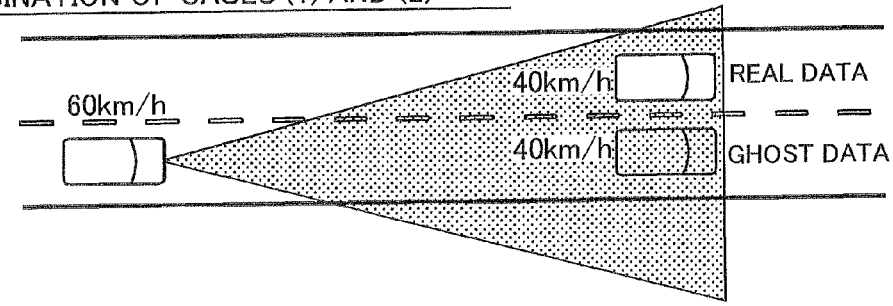
Figure 6D:
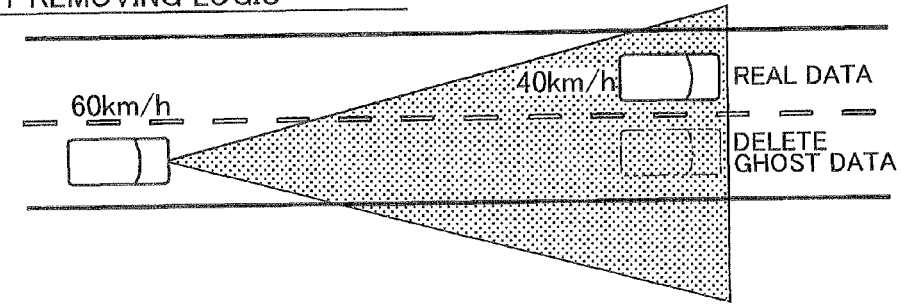
Figure 7A:
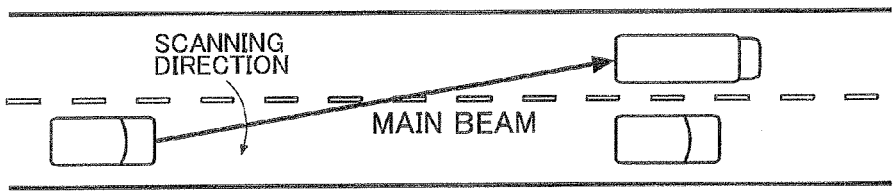
FIGS. 7A-7C are illustrations used to explain problems of the conventional approach.
Figure 7B:
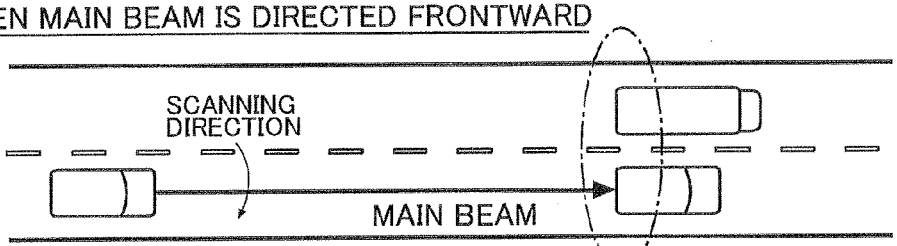
Figure 7C:
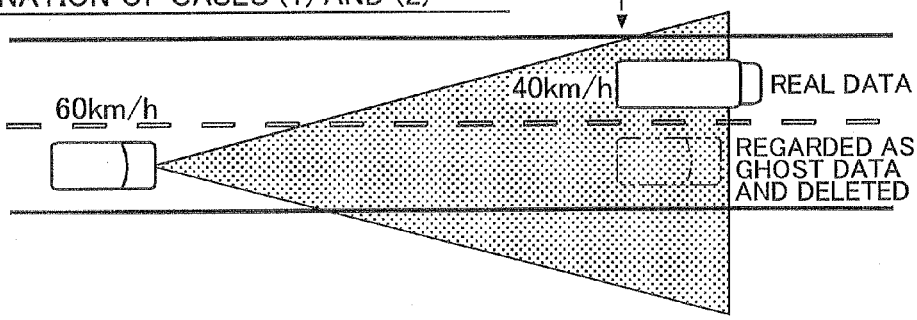
Figure 8A:
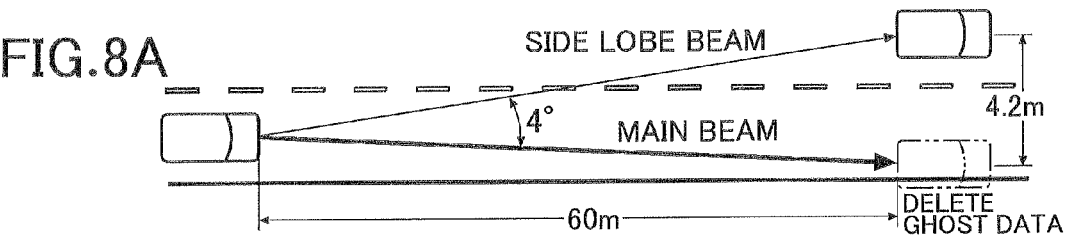
FIGS. 8A-8D are illustrations used to explain an approach of the present invention to delete a ghost target.
Figure 8B:
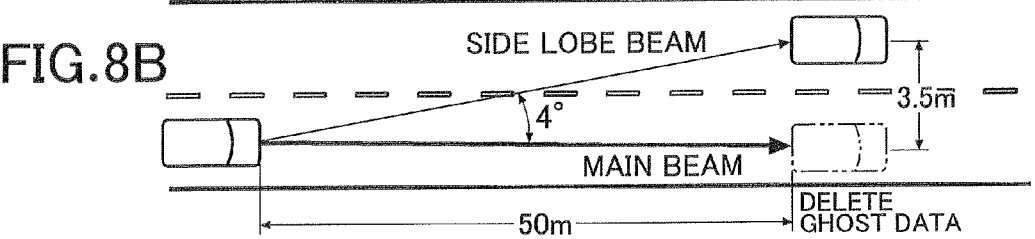
Figure 8C:
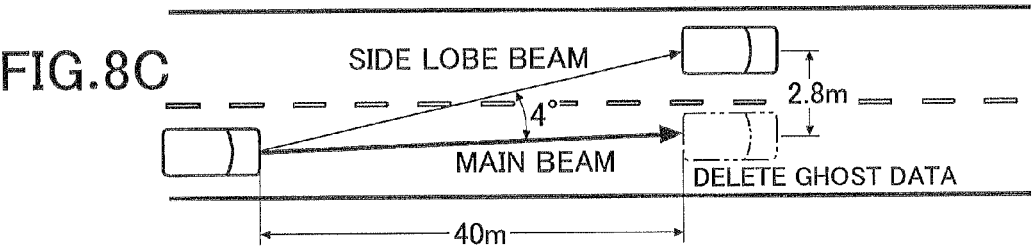
Figure 8D:
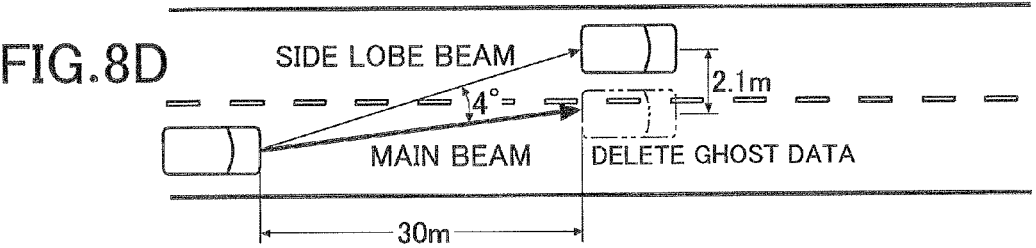
Figure 9A:
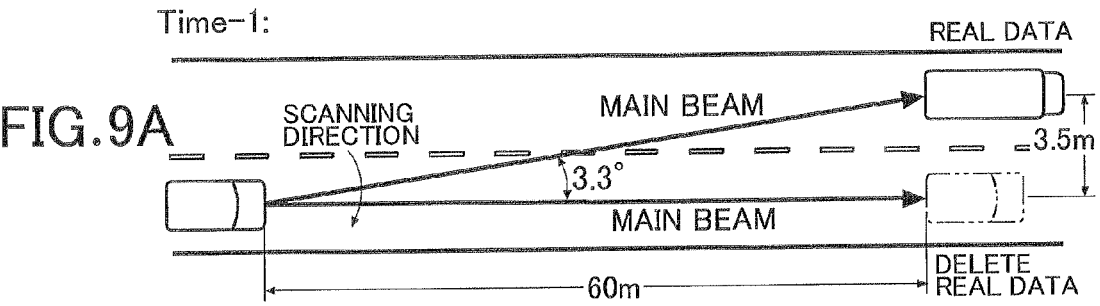
FIGS. 9A-9D are illustrations used to explain an approach of the present invention to judge running-abreast vehicles.
Figure 9B:
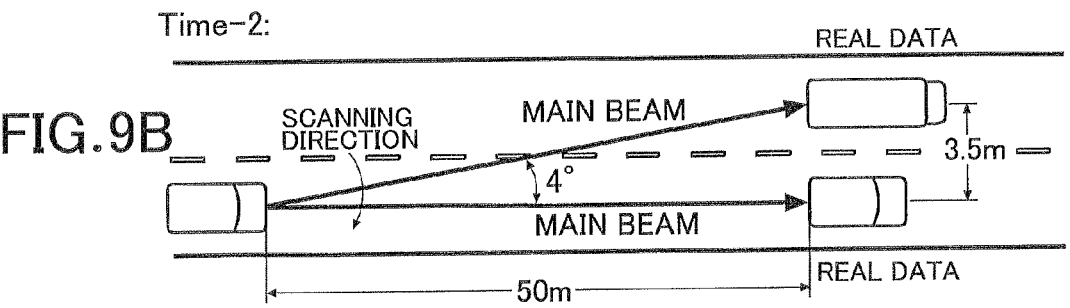
Figure 9C:
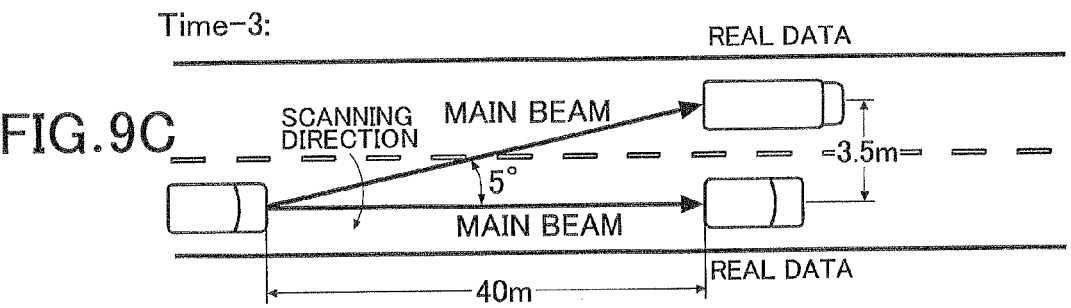
Figure 9D:
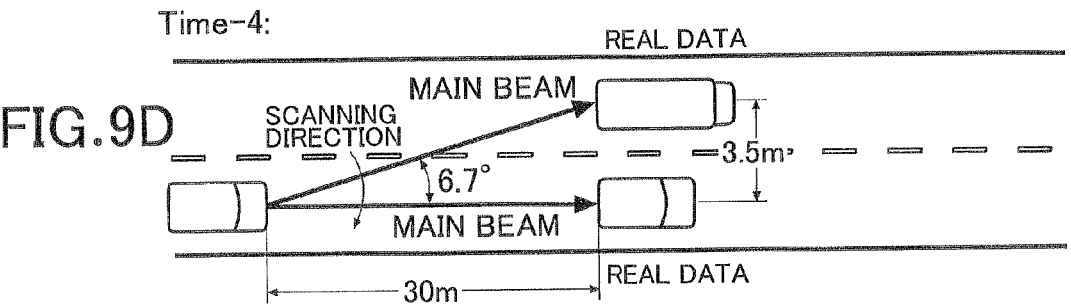

The object information calculating means M2 component of the central processing unit C analyzes the frequency of the beat signal by applying the FFT (Fast Fourier Transform) to the data set on the beat signal which is stored in the memory 11, and thus finds a spectral distribution. Based on the spectral data set, the object information calculating means M2 detects a spectrum (a peak signal), the detection level of which reaches the maximum value that is equal to or more than a predetermined threshold value. The peak signal on the increase side shown in FIG. 4A and the peak signal on the decrease side shown in FIG. 4B are detected symmetrically with respect to a peak position at a time when the relative speed between the subject vehicle and the object is "zero". Hence, based on the peak frequency Fup on the increase side and the peak frequency Fdn on the decrease side, the object information calculating means M2 calculates the distance of the object from the subject vehicle and the relative speed between the object and the subject vehicle. Specifically, the object information calculating means M2 calculates the distance of the subject vehicle to the object based on the sum of the two peak frequencies Fup, Fdn, and the relative speed between the subject vehicle and the object based on the difference between the two peak frequencies Fup, Fdn. Furthermore, based on the direction in which the transmitted wave is transmitted when the object is detected, the object information calculating means M2 calculates the angle (direction) of the object.

TABLE 1

PRESENT DETECTION MEMORY

| No. | INFORMATION NAME | |
|---|---|---|
| 1 | TARGET NUMBER | |
| 2 | DETECTION ANGLE | |
| 3 | DISTANCE | |
| 4 | RELATIVE SPEED | |
| 5 | RECEIVING LEVEL | |
| 6 | TAKEOVER COUNTER | PRESENT |
| 7 | EXTRAPOLATION COUNTER | DETECTION |
| 8 | GHOST PROCESS COMPLETION FLAG | DATA |
| 9 | MAIN TARGET NUMBER | |
| 10 | GHOST TARGET NUMBER | |
| 11 | GHOST DEFINITION FLAG | |
| 12 | ANGLE DIFFERENCE | |
| 13 | LEFT-RIGHT POSITIONAL DIFFERENCE | |
| 14 | t-1 DISTANCE | |
| 15 | t-1 ANGLE DIFFERENCE | |
| 16 | t-1 LEFT-RIGHT POSITIONAL DIFFERENCE | |
| 17 | t-2 DISTANCE | |
| 18 | t-2 ANGLE DIFFERENCE | |
| 19 | t-2 LEFT-RIGHT POSITIONAL DIFFERENCE | PAST HISTORY DATA |
| . | | |
| . | | |
| 38 | t-9 DISTANCE | |
| 39 | t-9 ANGLE DIFFERENCE | |
| 40 | t-9 LEFT-RIGHT POSITIONAL DIFFERENCE | |

As shown in Table 1, contents stored in the present detection memory M3 are divided into a present detection data group and a past history data group. Data sets stored in a field for the present detection data group are, respectively, a target number, a detection angle, a distance, a relative speed, a receiving level, a takeover counter, an extrapolation counter, a ghost process completion flag, a main target number, a ghost target number, a ghost definition flag, an angle difference, and a left-right positional difference. Data stored in a field for the past history data group corresponds to 9 cycles which is used to distinguish a running-abreast vehicle from a ghost target candidate, which will be described later. In this respect, the contents of data for each cycle are data sets, respectively, on a distance, an angle difference, and a left-right positional difference.

Each time one cycle is completed, the data set stored in the present detection memory M3 is transferred to the previous detection memory M4, and what is necessary from the data sets stored in the previous detection memory M4 is taken over as a data set to be stored in the present detection memory M3.

From the two targets whose distances from the subject vehicle are equal to each other, and whose receiving levels are different from each other, the ghost target candidate judging means M5 extracts, as a ghost target candidate, a target indicating the lower receiving level. From the ghost target candidate, the running-abreast target judging means M6 extracts a small-sized vehicle, such as a passenger vehicle, which runs side by side with a large-sized vehicle, such as a truck. The ghost target judging means M7 removes the above-described vehicle running side by side from consideration as a ghost target candidate, and thus only extracts a true ghost target.

TABLE 2

PRESENT OUTPUT MEMORY

| No. | INFORMATION NAME |
|---|---|
| 1 | TARGET NUMBER |
| 2 | DETECTION ANGLE |
| 3 | DISTANCE |
| 4 | RELATIVE SPEED |
| 5 | TAKEOVER COUNTER |
| 6 | EXTRAPOLATION COUNTER |

As shown in Table 2, only a true target data set obtained by deleting the true ghost data set from all the target data sets is stored in the present output memory M8. Contents of the true target data set are configured by including the target number, the detected angle, the distance, the relative speed, the takeover counter, and the extrapolation counter.

Based on the data set stored in the present output memory M8 in the central processing unit C, the vehicle controlling means M9 component of the electronic control unit U controls the operations, respectively, of the brake actuator Aa and the throttle actuator Ab to keep a constant distance between the subject vehicle and the preceding vehicle, for instance.

Next, descriptions will be provided of an approach for discriminating the ghost data set, which is generated due to the side lobe beam, by referring to FIGS. 8A to 8D and Table 3.

TABLE 3

| | | | | COMPARISON BETWEEN MAXIMUM VALUE AND MINIMUM VALUE | | |
|---|---|---|---|---|---|---|
| Time: | DISTANCE (m) | ANGLE DIFFERENCE (degree) | LEFT-RIGHT POSITIONAL DIFFERENCE (m) | DISTANCE DIFFERENCE (m) | ANGLE DIFFERENCE CHANGE (degree) | LEFT-RIGHT POSITIONAL DIFFERENCE CHANGE (m) |
| 1 | 60 | 4 | 4.2 | 0 | — | — |
| 2 | 50 | 4 | 3.5 | 10 | 0 | −0.7 |
| 3 | 40 | 4 | 2.8 | 20 | 0 | −1.4 |
| 4 | 30 | 4 | 2.1 | 30 | 0 | −2.1 |

| | GHOST DATA OUTPUT STATE | | | |
|---|---|---|---|---|
| Time: | GHOST DEFINITION FLAG OF PRESENT INVENTION | GHOST REMOVING LOGIC OF PRESENT INVENTION | CONVENTIONAL GHOST REMOVING LOGIC | WITHOUT GHOST REMOVING LOGIC |
| 1 | ON | DELETE | DELETE | OUTPUT |
| 2 | ON | DELETE | DELETE | OUTPUT |
| 3 | ON | DELETE | DELETE | OUTPUT |
| 4 | ON | DELETE | DELETE | OUTPUT |

Suppose that, at Time 1, a ghost data set is detected in the direction of the main beam, whereas a real data set is detected in the direction of the side lobe beam; and the distances of the two respective data sets from the subject vehicle are both 60 m, while the left-right positional difference between the two data sets is 4.2 m. At Time 2, both distances of the two respective data sets from the subject vehicle are reduced to 50 m, and the left-right positional difference between the two data sets is reduced to 3.5 m in response to the reduction of the distances from the subject vehicle. At Time 3, both distances of the two respective data sets from the subject vehicle are reduced to 40 m, and the left-right positional difference between the two data sets is reduced to 2.8 m in response to the reduction of the distances from the subject vehicle. At Time 4, both distances of the two respective data sets from the subject vehicle are reduced to 30 m, and the left-right positional difference between the two data sets is reduced to 2.1 m in response to the reduction of the distances from the subject vehicle. From Time 1 through Time 4, the angle difference between the two data sets is fixed at an angle difference between the main beam and the side lobe beam, which is 4 degrees.

As described above, when the distances of the respective two data sets from the subject vehicle become smaller or larger, it can be judged that a ghost data set generated due to the side lobe beam is detected in a case where the angle difference between the two data sets remains unchanged. However, the left-right positional difference decreases as the distances from the subject vehicle become smaller, or the left-right positional difference increases as the distances therefrom become larger.

Next, descriptions will be provided of an approach for judging whether large-sized and small-sized vehicles run side by side, by referring to FIGS. 9A to 9D and Table 4.

TABLE 4

| | | | | COMPARISON BETWEEN MAXIMUM VALUE AND MINIMUM VALUE | | |
|---|---|---|---|---|---|---|
| Time: | DISTANCE (m) | ANGLE DIFFERENCE (degree) | LEFT-RIGHT POSITIONAL DIFFERENCE (m) | DISTANCE DIFFERENCE (m) | ANGLE DIFFERENCE CHANGE (degree) | LEFT-RIGHT POSITIONAL DIFFERENCE CHANGE (m) |
| 1 | 60 | 3.3 | 3.5 | 0 | — | — |
| 2 | 50 | 4.0 | 3.5 | 10 | 0.67 | 0 |
| 3 | 40 | 5.0 | 3.5 | 20 | 1.67 | 0 |
| 4 | 30 | 6.7 | 3.5 | 30 | 3.33 | 0 |

| | | GHOST DATA OUTPUT STATE | | |
|---|---|---|---|---|
| Time: | GHOST DEFINITION FLAG OF PRESENT INVENTION | GHOST REMOVING LOGIC OF PRESENT INVENTION | CONVENTIONAL GHOST REMOVING LOGIC | WITHOUT GHOST REMOVING LOGIC |
| 1 | ON | DELETE | DELETE | OUTPUT |
| 2 | OFF | OUTPUT | DELETE | OUTPUT |
| 3 | OFF | OUTPUT | DELETE | OUTPUT |
| 4 | OFF | OUTPUT | DELETE | OUTPUT |

Suppose that at Time 1, a large-sized truck is detected in the direction of the left adjacent lane, whereas a small-sized passenger vehicle is detected in the direction of the lane in which the subject vehicle is traveling; and the distances of the two respective data sets from the subject vehicle are both 60 m, while the angle difference between the two data sets is 3.3 degrees. At Time 2, both distances of the two respective data sets from the subject vehicle are reduced to 50 m, and the angle difference between the two data sets increases to 4 degrees in response to the reduction of the distances. At Time 3, both distances of the two respective data sets from the subject vehicle are reduced to 40 m, and the angle difference between the two data sets increases to 5 degrees in response to the reduction of the distances. At Time 4, both distances of the two respective data sets from the subject vehicle are reduced to 30 m, and the angle difference between the two data sets increases to 6.7 degrees in response to the reduction of the distances. From time T1 through Time 4, the left-right positional difference between the two data sets is fixed at a constant 3.5 m.

As described above, when the distances of the two data sets from the subject vehicle become smaller or larger, it can be judged that the large-sized and small-sized vehicles run side by side in a case where the left-right positional difference between the two data sets remains unchanged. However, the angle difference increases as the distances from the subject vehicle become smaller, or the angle difference decreases as the distances therefrom become larger. As such, it is possible to prevent the data set, which indicates the smaller receiving level, from being erroneously judged and deleted as a ghost data set.

The following points should be noted. Neither change in the angle difference nor change in the left-right positional difference can be calculated when the passenger vehicle is detected for the first time. For this reason, the data set on the passenger vehicle is deleted as a ghost data set when the passenger vehicle is detected for the first time. However, in a situation where the passenger vehicle is successively detected for the second time or additional more times, the data set on the passenger vehicle is outputted as a data set on the running-abreast vehicle instead of being deleted as the ghost data set.

Next, further descriptions will be provided for the above-described operations, by referring to FIGS. 10 to 14.

Figure 10:
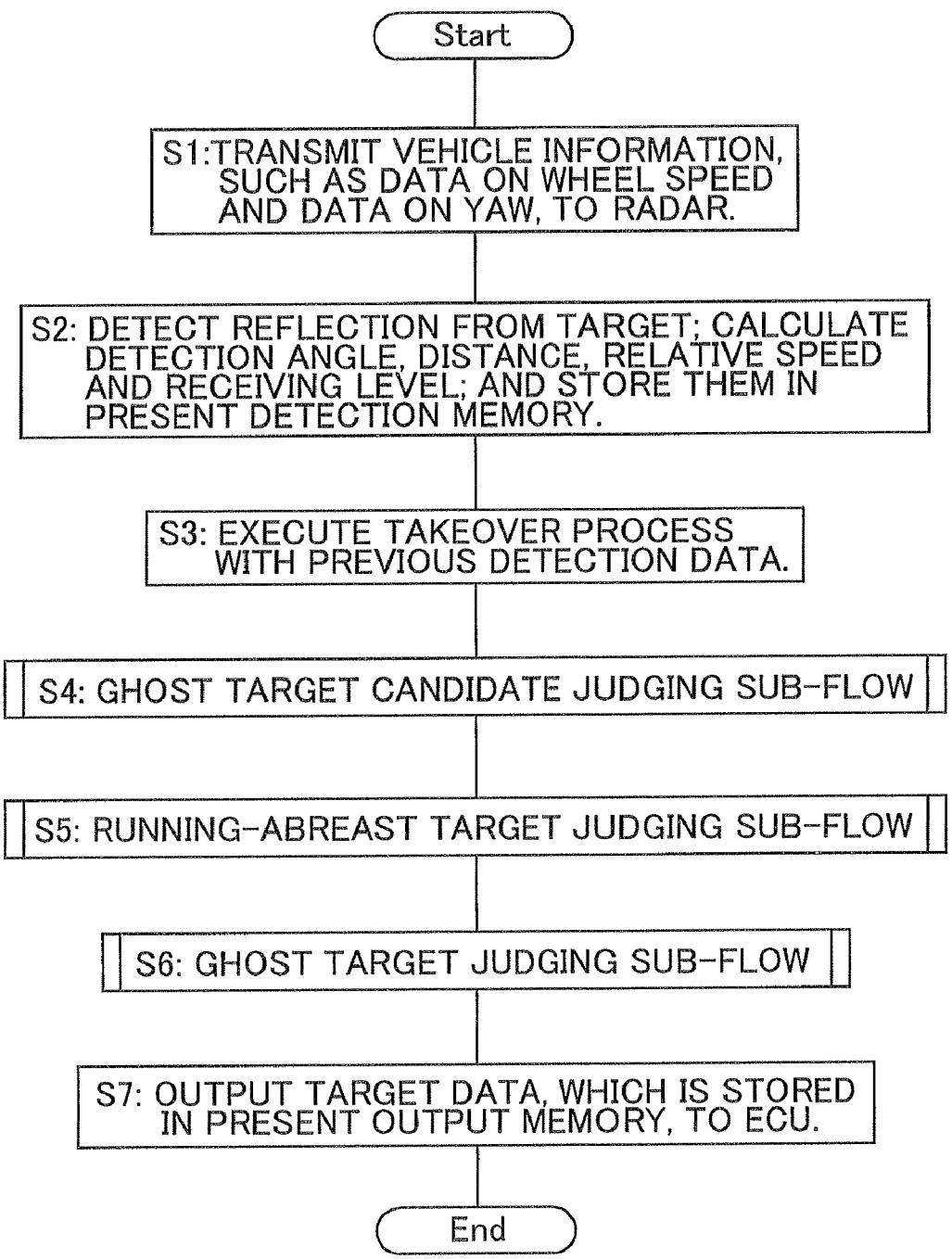
FIG. 10 is a flowchart of a main routine.

First, in step S1 of the flowchart shown in FIG. 10, vehicle conditions including a wheel speed and a yaw rate is transmitted to the radar system R. Subsequently, in step S2, a reflected wave from a target is detected. Thus, a detection angle, distance, relative speed and receiving level of the target are calculated, and data sets on these items are stored in the present detection memory. Thereafter, in step S3, the takeover process is carried out between the present detection data and the previous detection data.

Subsequently, in step S4, a ghost target candidate judging subroutine is executed. In step S5, a running-abreast target judging subroutine is executed. In step S6, a ghost target judging subroutine is executed. In step S7, a target data set stored in the present output memory is outputted to the vehicle controlling means M9.

Figure 11:
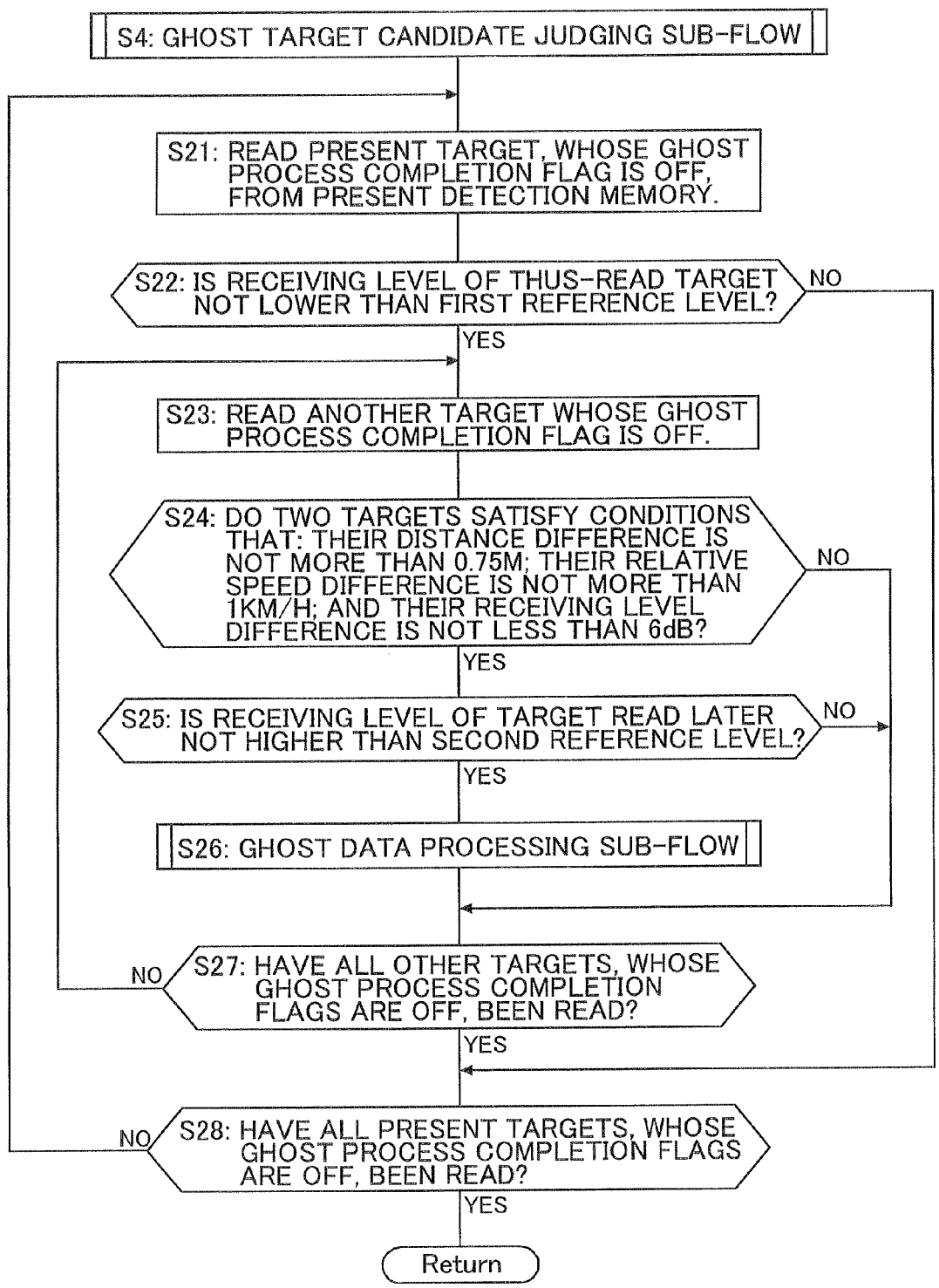
FIG. 11 is a flowchart of a subroutine of step S3 of the main routine shown in FIG. 10.

Next, descriptions will be provided of step S4 (the ghost target judging subroutine) in FIG. 11.

First, in step S21, a present target whose ghost process completion flag is OFF (indicating that no ghost process has been executed yet) is read from the present detection memory M3. If the receiving level of the target thus read is not lower than a first reference level in step S22, another target whose ghost process completion flag is OFF (indicating that no ghost process has been executed yet) is read in step S23. The reason for selecting a target whose receiving level is not lower than the first reference level in step S22 is that no ghost data set can be obtained from a target whose receiving level is lower than the first reference level.

Subsequently, in step S24, it is judged whether the two targets satisfy conditions that their distance difference is not more than 0.75 m; their relative speed difference is not more than 1 km/h; and their receiving level difference is not less than 6 dB. If the two targets satisfy the conditions, it is judged in step S25 whether the receiving level of the target which has been read later is not higher than a second reference level lower than the first reference level. If true, it is judged that, of the two targets whose distances and vehicle speeds are substantially equal to each other, the target whose receiving level is lower than the other is likely to be a ghost. Then, in step S26, a ghost data processing subroutine is executed.

Figure 12:
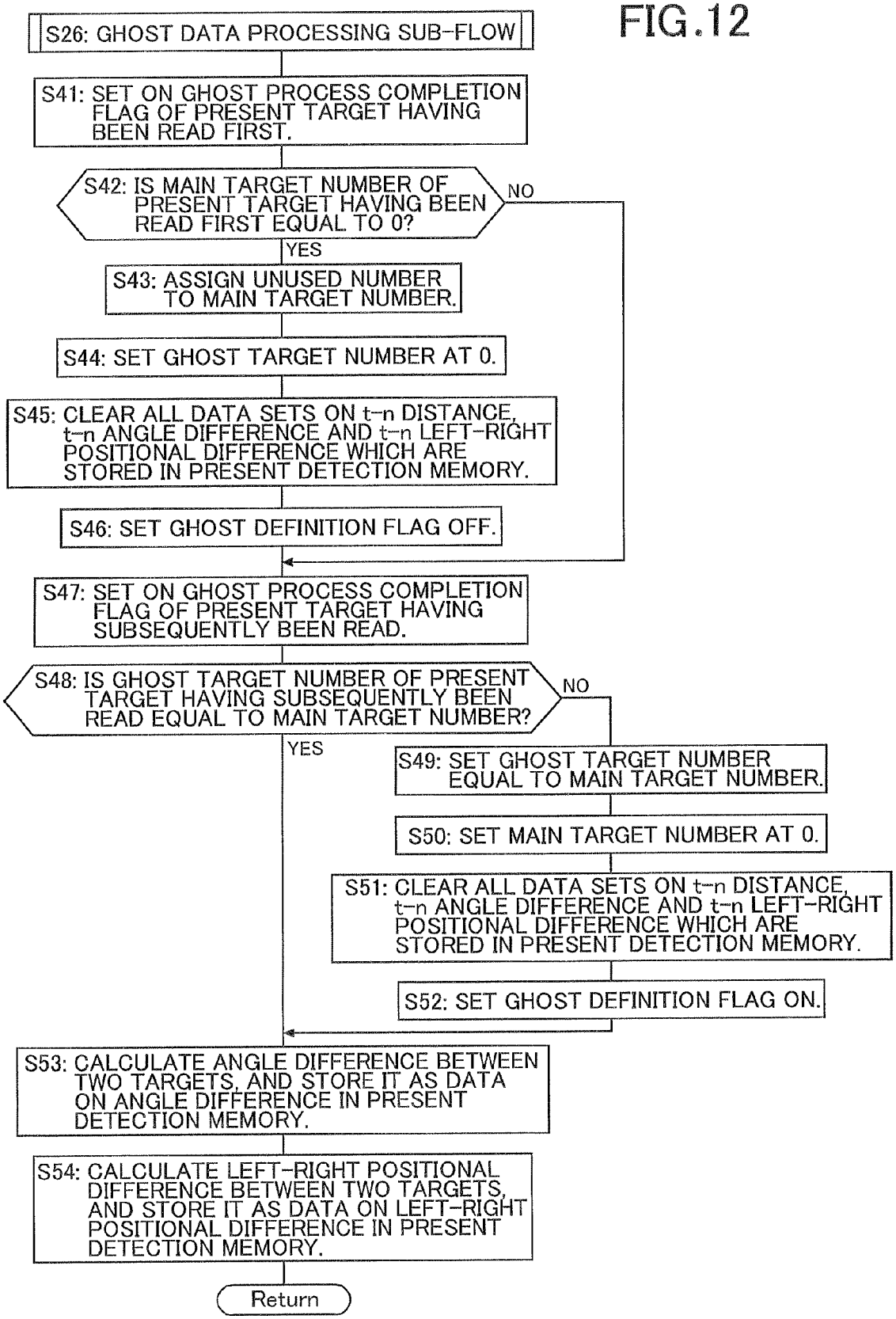
FIG. 12 is a flowchart of a subroutine of step S26 of the subroutine in FIG. 11.

Next, a description will be provided of step S26 (the ghost data processing subroutine) in FIG. 12.

First, in step S41, the ghost process completion flag of the present target having been read first is set to ON. Subsequently, if it is judged in step S42 that the main target number of the present target having been read first is 0 (meaning that the target is detected for the first time; and no takeover process has been executed for the target yet), an unused number is assigned to the main target number of the present target in step S43. Because the present target having been read first is defined as a main target in step S43, the ghost target number of the present target is set at 0. Subsequently, in step S45, because the original main target number of the present target is 0 and the present target is not a taken-over target which has taken over the past history data, all the t-n distance, the t-n angle difference and the t-n left-right positional difference for the present target which are stored in the present detection memory are cleared (see Table 1). In other words, the entire past history data group corresponding to the present detection data group is cleared. Thereafter, in step S46, the ghost definition flag of the present target having been read first is set to OFF, because the present target is the main target, but not the ghost target.

In a situation where it is judged, in step S42, that the present target having been read first is a taken-over target because its main target number is not 0, or in a situation where the process goes through steps S43 to 46, the ghost process completion flag of the present target having subsequently been read is set to ON in step S47. Thereafter, if it is judged in step S48 that the ghost target number of the present target having subsequently been read is equal to the main target number of the present target having been read first, i.e., if it is judged in step S48 that a parent-child relationship between the main target and the ghost target has been established between the two targets, in step S53 an angle difference between the directions in which the two respective targets are detected is calculated, and is stored as a data set on an angle difference in the present detection memory M3. In addition, in step S54, a left-right positional difference representing a distance between the two targets in the left-right direction is calculated, and is stored as a data set on a left-right positional difference in the present detection memory M3.

If it is judged in step S48 that the ghost target number of the present target having subsequently been read is not equal to the main target number of the present target having been read first, i.e., if it is judged in step S48 that the parent-child relationship between the main target and the ghost target has not been established between the two targets, it is judged in step S49 that the relationship between the main target and the ghost target is established between the two targets. Thus, the ghost target number is set to the main target number of the present target having been read first. Thereafter, in step S50, the main target number is set at 0.

Subsequently, in step S51, because the present target having subsequently been read is not a taken-over target since its main target number is 0, the t-n distance, the t-n angle difference, and the t-n left-right positional difference, which are stored in the present detection memory, are cleared (see Table 1). In other words, the entire past history data group corresponding to the present detection data group is cleared. Thereafter, in step S52, the ghost definition flag of the present target having subsequently been read is set to ON, because the present target is the ghost target but not the main target. Afterward, the above-mentioned steps S53 and S54 are performed.

Returning to the flowchart in FIG. 11, until it is judged in step S27 that all the targets other than the present target whose ghost process completion flags are set to OFF have already been read, steps S23 to S26 are repeated. After that, until it is judged in step S28 that all the present targets whose ghost process completion flags are set to OFF have already been read, steps S21 to S27 are repeated.

Figure 13:
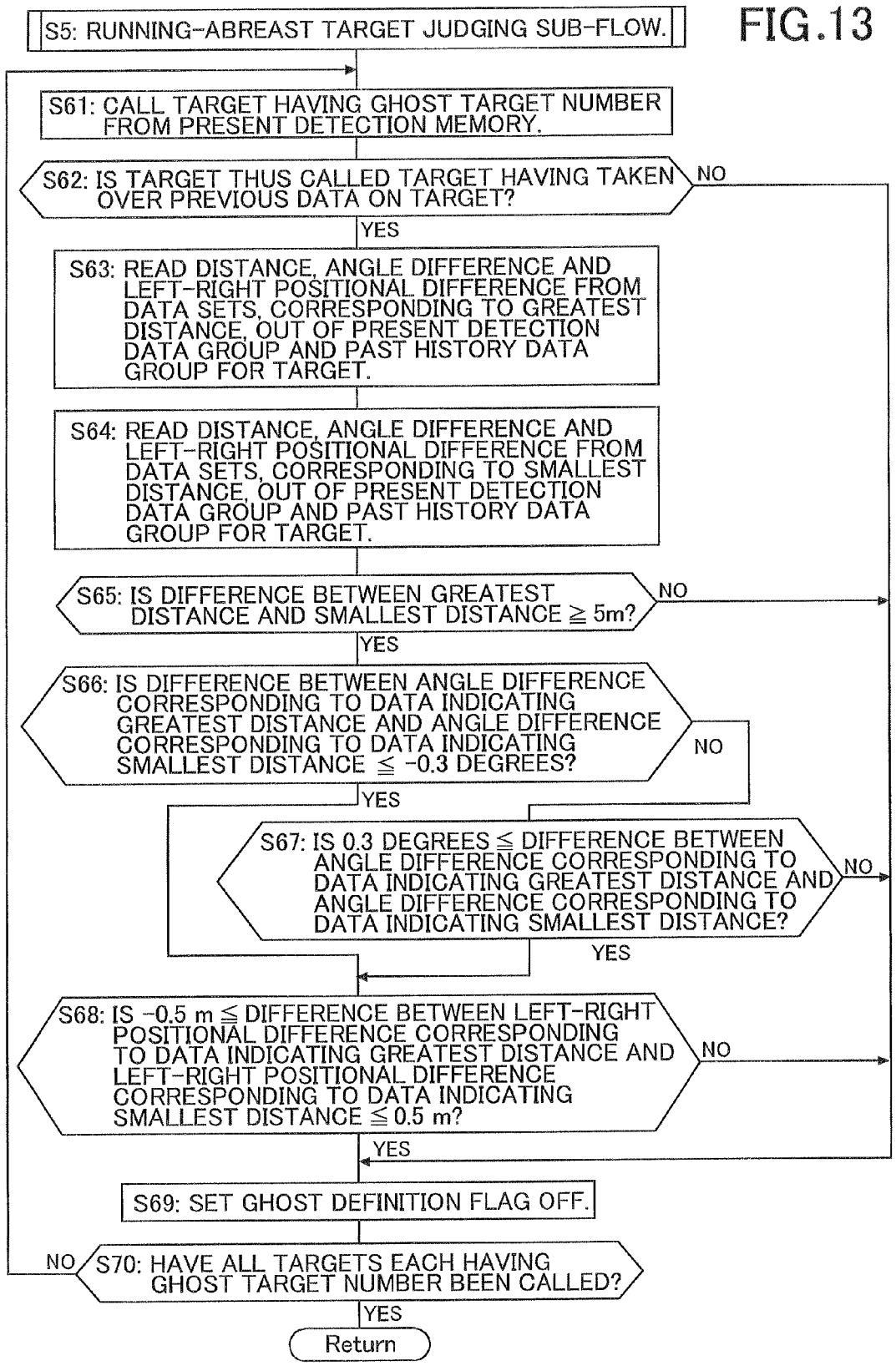
FIG. 13 is a flowchart of a subroutine of step S5 of the main routine shown in FIG. 10.

Next, descriptions will be provided of step S5 (the running-abreast target judging subroutine) in FIG. 13.

First, in step S61, a target having a ghost target number, which is likely to be a deleted object, is recalled from the present detection memory M3. If it is judged in step S62 that the thus-called target is not a target which has taken over previous data sets, steps S63 to S69 are skipped because it is impossible to judge whether the thus-called target is a running abreast target.

If it is judged in step S62 that the thus-called target is a target which has taken over previous data sets, in step S63, the distance, the angle difference, and the left-right positional difference are read from data sets, corresponding to the greatest distance, from the present detection data group and the past history data group for the target. In addition, in step S64, the distance, the angle difference, and the left-right positional difference are read from data sets, corresponding to the smallest distance, from the present detection data group and the past history data group for the target.

When it is judged in step S65 that the difference between the "greatest distance" and the "smallest distance" is not less than 5 m, and when the target is identified as a ghost target or as a running-abreast target, the process proceeds to step S66. When it is judged in step S66 that the difference between the "angle difference corresponding to the data indicating the greatest distance" and the "angle difference corresponding to the data indicating the smallest distance" is not more than −0.3 degrees, the process proceeds to step S68. Otherwise, when it is judged in step S67 that the difference between the "angle difference corresponding to the data indicating the greatest distance" and the "angle difference corresponding to the data indicating the smallest distance" is not less than 0.3 degrees, the process proceeds to step S68. When it is judged in step S68 that the difference between the "left-right positional difference corresponding to the data indicating the greatest distance" and the "left-right positional difference corresponding to the data indicating the smallest distance" is not less than −0.5 m and not more than 0.5 m, in step S69 it is judged that the target, which is likely to be a ghost target, is actually a running-abreast target, and the ghost definition flag of the target is set to OFF. Thereafter, until it is judged in step S70 that all the targets having their respective ghost target numbers have already been called, steps S61 to S69 are repeated.

TABLE 5

| No. | ANGLE | LEFT-RIGHT POSITION | JUDGING | GHOST DEFINITION FLAG |
|---|---|---|---|---|
| 1 | NOT CHANGED | NOT CHANGED | IMPOSSIBLE TO JUDGE | ON |
| 2 | NOT CHANGED | CHANGED | DETECT GHOST | ON |
| 3 | CHANGED | NOT CHANGED | DETECT RUNNING-ABREAST VEHICLE | OFF |
| 4 | CHANGED | CHANGED | IMPOSSIBLE TO JUDGE | ON |

Table 5 is a summary of the operations of steps S66 to S69.

When the data indicating the greatest distance and the data indicating the smallest distance are compared, if the distances of the subject vehicle to the targets change while the "angle difference" and "left-right positional difference" remain unchanged, it is impossible to judge whether the target, which is likely to be a ghost target, is a ghost target or a running-abreast target. For this reason, the ghost definition flag of the target remains ON.

When the data indicating the greatest distance and the data indicating the smallest distance is compared, if the "angle difference" remains unchanged while the "left-right positional differences" changes, it is judged that the target, which is likely to be a ghost target, is surely the ghost target. For this reason, the ghost definition flag of the target is set to ON.

When the data indicating the greatest distance and the data indicating the smallest distance is compared, if the "angle difference" changes while the "left-right positional difference" remains unchanged, it is judged that the target, which is likely to be a ghost target, is actually the running-abreast target. For this reason, the ghost definition flag of the target is set to OFF.

When the data indicating the greatest distance and the data indicating the smallest distance is compared, if the "angle difference" changes while the "left-right positional difference" changes, it is impossible to judge whether the target, which is likely to be a ghost target, is the ghost target or the running-abreast target. For this reason, the ghost definition flag of the target remains ON.

Figure 14:
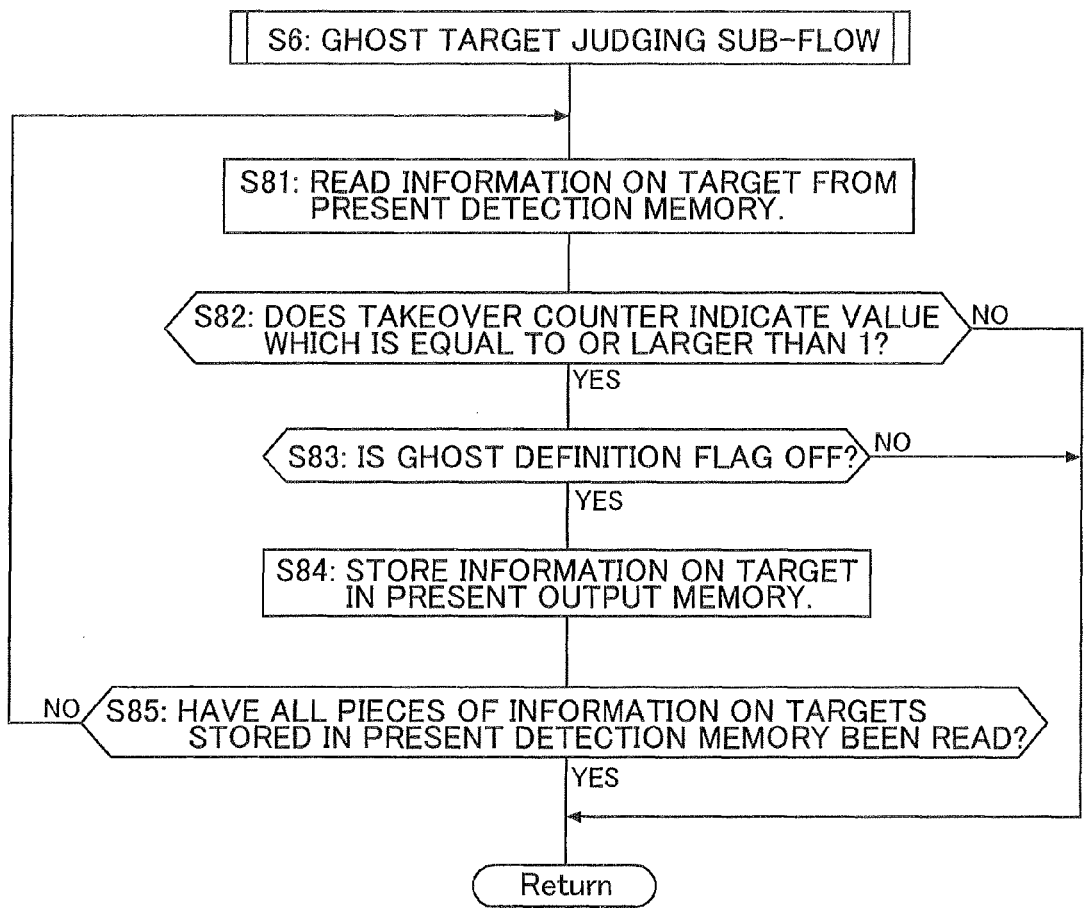
FIG. 14 is a flowchart of a subroutine of step S6 of the main routine shown in FIG. 10.

Next, descriptions will be provided of step S6 (the ghost target judgment subroutine) in FIG. 14.

First, in step S81, a piece of information on the target is read from the present detection memory M3. Thereafter, if it is judged in step S82 that the takeover counter in which the number of times the target has been so far taken over is stored indicates a value which is equal to or larger than 1, and if it is judged in step S83 that the ghost definition flag of the target is OFF and thus the target is not a ghost target, the piece of information on the target is stored in the present output memory M8 in step S84. Until it is judged in step S85 that all the information on targets stored in the present detection memory M3 has been read, steps S81 to S84 are repeated.

As described above, in the case where the distances of the two targets from the subject vehicle are equal to each other and where the difference between the receiving levels of the two targets is not smaller than the predetermined value, the ghost target candidate judging means M5 judges that one target is a candidate for the ghost target of the other target. The running-abreast target judging means M6 judges that one target is the target running abreast of the other target based on the changes in the angle difference and in the left-right positional difference between the two targets, wherein the changes correspond to the change in the distances of the two targets from the subject vehicle. The ghost target judging means M7 judges, as the ghost target, a target obtained by removing the running-abreast target judged by the running-abreast target judging means M6, from candidates for the ghost target judged by the ghost target candidate judging means M6. Consequently, it is possible to prevent the running-abreast target from being erroneously recognized as the ghost target while judging which target is the ghost target with higher precision.

Particularly, the running-abreast target judging means M6 judges that one target is the target running abreast of the other target in the case where the change in the distances of the two targets from the subject vehicle is accompanied by the change in the angle difference between the two targets, but is not accompanied by the change in the left-right positional difference between the two targets. For this reason, it is possible to judge which target is the running-abreast target with higher precision. In addition, the running-abreast target judging means M6 judges that one target is not the target running abreast of the other target in the case where the change in the distances of the two targets from the subject vehicle is not accompanied by the change in the angle difference between the two targets, but is accompanied by the change in the left-right positional difference between the two targets. For this reason, it is possible to judge which target is the ghost target with higher precision.

The preferred embodiment of the present invention has been described above. However, various modifications of the present invention can be made within the scope of the invention and without departing from the gist or spirit of the invention.

For instance, the vehicle-to-vehicle distance controller has been provided as an example of the vehicle controlling means M9. Alternatively, it is within the scope of the invention to use a system configured to help reduce contact damage or an ACC system (an adaptive cruise control system) as the vehicle controlling means M9.

Further, the millimeter-wave radar has been shown as an example of the radar system R. Alternatively, it is within the scope of the invention to use any other means, such as a laser radar, as the radar system R.

What is claimed is:

1. An object detecting apparatus configured to detect a target by transmitting an electromagnetic wave, and by receiving a reflected wave resulting from reflection of the electromagnetic wave by the target, the apparatus comprising:

ghost target candidate judging means (M5) configured to judge that a first target of two targets is a candidate for a ghost target of a second target of the two targets in a situation where distances of the two targets from a subject vehicle are equal to each other and where a difference between receiving levels of the two targets is equal to or larger than a predetermined value;

running-abreast target judging means (M6) configured to judge that the first target is a target running abreast of the second target based on changes in an angle difference and in a left-right positional difference between the two targets in accordance with a change in the distances of the two targets from the subject vehicle; and ghost target judging means (M7) configured to judge, as a ghost target, a target obtained by removing the running-abreast target judged by the running-abreast target judging means (M6) from the candidates for the ghost target judged by the ghost target candidate judging means (M5).

2. The object detecting apparatus according to claim 1, wherein the running-abreast target judging means (M6) judges that the first target is the target running abreast of the second target in a situation where a change in the distances of the two targets from the subject vehicle is accompanied by a change in the angle difference between the two targets and free of a change in the left-right positional difference between the two targets.

3. The object detecting apparatus according to claim 1, wherein the running-abreast target judging means (M6) judges that the first target is not the target running abreast of the second target in a situation where a change in the distances of the two targets from the subject vehicle is free of a change in the angle difference between the two targets and is accompanied by a change in the left-right positional difference between the two targets.

4. An object detecting method configured to detect a target by transmitting an electromagnetic wave, and by receiving a reflected wave resulting from reflection of the electromagnetic wave by the target, the method comprising steps of:

judging that a first target of two targets is a candidate for a ghost target of a second target of the two targets in a situation where distances of the two targets from a subject vehicle are equal to each other and where a difference between receiving levels of the two targets is equal to or larger than a predetermined value;

judging that the first target is a target running abreast of the second target based on changes in an angle difference and in a left-right positional difference between the two targets in accordance with a change in the distances of the two targets from the subject vehicle; and judging, as a ghost target, a target obtained by removing the running-abreast target from the candidates for the ghost target.

5. The object detecting method according to claim 4, wherein the method judges that the first target is the target running abreast of the second target in a situation where a change in the distances of the two targets from the subject vehicle is accompanied by a change in the angle difference between the two targets and free of a change in the left-right positional difference between the two targets.

6. The object detecting method according to claim 4, wherein the method judges that the first target is not the target running abreast of the second target in a situation where a change in the distances of the two targets from the subject vehicle is free of a change in the angle difference between the two targets and is accompanied by a change in the left-right positional difference between the two targets.

* * * * *